(12) United States Patent
Han et al.

(10) Patent No.: US 12,149,622 B2
(45) Date of Patent: Nov. 19, 2024

(54) USER STATE TRACKING SYSTEM AND OPERATING METHOD THEREOF

(71) Applicant: SAMSUNG ELECTRONICS CO., LTD., Suwon-si (KR)

(72) Inventors: Dongku Han, Suwon-si (KR); Lakshmi Prasanna Jasti, Bangalore (IN); Hyeonwoo Noh, Hwaseong-si (KR); Keunyoung Park, Seongnam-si (KR); Sungbo Ahn, Hwaseong-si (KR); Jiyoung Yu, Gwacheon-si (KR); Eunjin Youn, Suwon-si (KR); Bora Hyun, Hwaseong-si (KR); Jongchul Kim, Suwon-si (KR); Jaesik Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 447 days.

(21) Appl. No.: 17/520,315

(22) Filed: Nov. 5, 2021

(65) Prior Publication Data
US 2022/0329426 A1    Oct. 13, 2022

(30) Foreign Application Priority Data
Apr. 8, 2021    (KR) .................. 10-2021-0046097

(51) Int. Cl.
*H04L 29/06*    (2006.01)
*G06F 11/34*    (2006.01)
(Continued)

(52) U.S. Cl.
CPC ........ *H04L 9/3213* (2013.01); *G06F 11/3438* (2013.01); *G06F 11/3476* (2013.01); *H04L 9/0822* (2013.01); *H04L 9/3236* (2013.01)

(58) Field of Classification Search
CPC ... H04L 9/3213; H04L 9/0822; H04L 9/3236; H04L 2209/42; G06F 11/3438;
(Continued)

(56) References Cited

U.S. PATENT DOCUMENTS 7,433,694 B2    10/2008    Morgan
7,802,724 B1    9/2010    Nohr
(Continued)

FOREIGN PATENT DOCUMENTS

KR    10-1453454    10/2014
KR    10-2016-0117914    10/2016
(Continued)

OTHER PUBLICATIONS

Claude Castelluccia, Nataliia Bielova, Antoine Boutet, Mathieu Cunche, Cédric Lauradoux, et al.. Robert: ROBust and privacy-presERving proximity Tracing. 2020. ffhal-02611265f (Year: 2020).*
(Continued)

*Primary Examiner* — Yogesh Paliwal
(74) *Attorney, Agent, or Firm* — F. CHAU & ASSOCIATES, LLC

(57) ABSTRACT

A user log information output system includes a first user device configured to generate first user information by encrypting a unique identification (ID) of a first user according to a scheduled time; a first user server configured to generate first server information including a server group code of a hierarchical server group; a second user device configured to receive real-time token information through communication with the first user device, the real-time token information being generated based on the first user information and the first server information; and a second user server configured to generate proximity log information regarding the first user by reading the first user information and the first server information of the real-time token
(Continued)

information received from the real-time token information from the second user device.

13 Claims, 12 Drawing Sheets

(51) Int. Cl.
*H04L 9/08* (2006.01)
*H04L 9/32* (2006.01)

(58) Field of Classification Search
CPC ..... G06F 11/3476; H04W 4/80; H04W 4/029; H04W 12/02; G16H 50/80
See application file for complete search history.

(56) References Cited

U.S. PATENT DOCUMENTS

| | | | |
|---|---|---|---|
| 7,930,197 | B2 | 4/2011 | Ozzie et al. |
| 9,171,451 | B2 | 10/2015 | Blom |
| 9,679,140 | B2 | 6/2017 | Smith et al. |
| 10,219,100 | B2 | 2/2019 | Luna |
| 10,416,698 | B2 | 9/2019 | Imes |
| 10,497,470 | B2 | 12/2019 | Chi et al. |
| 10,571,999 | B2 | 2/2020 | Tanaka et al. |
| 2014/0167917 | A2 | 6/2014 | Wallace et al. |
| 2016/0063209 | A1 | 3/2016 | Malaviya |
| 2018/0052970 | A1* | 2/2018 | Boss ............... G06F 21/35 |
| 2019/0252078 | A1 | 8/2019 | Schubert et al. |
| 2019/0362826 | A1* | 11/2019 | Viskovich ......... G06Q 20/065 |
| 2021/0360366 | A1* | 11/2021 | Bailey ............... G08B 7/06 |

FOREIGN PATENT DOCUMENTS

| | | |
|---|---|---|
| KR | 10-2017-0053145 | 5/2017 |
| KR | 10-2017-0127144 | 11/2017 |
| KR | 10-2018-0010434 | 6/2018 |
| KR | 10-1873847 | 6/2018 |
| KR | 10-1885031 | 7/2018 |

OTHER PUBLICATIONS

Troncasa et al., "Decentralized Privacy-Preserving Proximity Tracing", Version: Apr. 12, 2020, pp. 1-33 (Year: 2020).*
Chan et al., "PACT: Privacy-Sensitive Protocols and Mechanisms for Mobile Contact Tracing", Bulletin of the IEEE Computer Society Technical Committee on Data Engineering, 2020, pp. 15-35.
"Contact Tracing Bluetooth Specification Preliminary—Subject to Modification and Extension", Apr. 2020, v1.1, pp. 1-6.
"Contact Tracing Cryptography Specification Preliminary—Subject to Modification and Extension", Apr. 2020, pp. 1-12.
"Contact Tracing Framework Documentation (API) Preliminary—Subject to Modification and Extension", Apr. 2020, pp. 1-15.
Troncoso et al., "Decentralized Privacy-Preserving Proximity Tracing", Version: Apr. 12, 2020, pp. 1-33.
"PEPP-PT Building Blocks for Pandemic Management Systems using Proximity Tracing", Apr. 2020, 8 pages.
"PEPP-PT Data Protection and Information Security Architecture", Apr. 2020, PEPP-PT—Pan-European Privacy—Preserving Proximity Tracing, https://www.pepp-pt.org/, pp. 1-26.
"PEPP-PT Overview of Sample Mobile Application", 3 pages.
Castelluccia et al., "Robert: ROBust and privacy-presERving proximity Tracing", May 2020, v1.1, pp. 1-14.

* cited by examiner

USER STATE TRACKING SYSTEM AND OPERATING METHOD THEREOF

CROSS-REFERENCE TO RELATED APPLICATION

This application claims priority under 35 U.S.C. § 119 to Korean Patent Application No. 10-2021-0046097 filed on Apr. 8, 2021, in the Korean Intellectual Property Office, the disclosure of which is incorporated by reference herein in its entirety.

TECHNICAL FIELD

The inventive concept relates to a user state tracking system, and more particularly, to a system for tracking a user state and an operating method thereof.

DISCUSSION OF THE RELATED ART

Proximity between users may be determined in many ways. For example, if a user's electronic device comes within a certain distance of another user's electronic device, the two devices may exchange information that is unique to their devices. In some instances, this unique "token" information may include further data, such as state data about the users themselves.

In accordance with the users' permissions and the design of the systems used, the state of a user and/or a group of users may be continuously tracked by allowing log information to be stored for an amount of time. However, there is a need for tracking systems which provide increased security.

SUMMARY

The inventive concept provides systems and methods for efficiently outputting user log information and tracking a user state, thereby increasing personal information security.

In some comparative examples, tracking systems between user terminals (such as electronic devices, including personal computers or phones) may share information that is not intended to be shared, or may share information for a longer period of time than is intended. Accordingly, there is a need for a system that can share user state information with increased security.

According to an aspect of the inventive concept, a user log information output system includes a first user device configured to generate first user information by encrypting a unique identification (ID) of a first user according to a scheduled time; a first user server configured to generate first server information, the first server information including a server group code of a hierarchical server group; a second user device configured to receive real-time token information from the first user device, the real-time token information being generated based on the first user information and the first server information; and a second user server configured to generate proximity log information regarding the first user by reading the first user information and the first server information of the real-time token information received from the real-time token information from the second user device.

According to another aspect of the inventive concept, a user state tracking system includes a first user system configured to generate real-time token information regarding a first user according to a scheduled time; and a second user system configured to provide second user information to the first user system in response to reception of the real-time token information from the first user system, wherein the first user system and the second user system exchange user state information with a third user system that stores user information of a third user.

According to a further aspect of the inventive concept, an operating method of a user log information output system includes the following: generating user information by encrypting a unique ID of a user according to a scheduled time; generating server information including a server group code of a hierarchical server group; and generating real-time token information regarding the user based on the user information and the server information.

BRIEF DESCRIPTION OF THE DRAWINGS

The above and other aspects and features of the present disclosure will become more apparent by describing in detail embodiments thereof while referring to the attached drawings, in which.

DETAILED DESCRIPTION OF THE EMBODIMENTS

Figure 1:
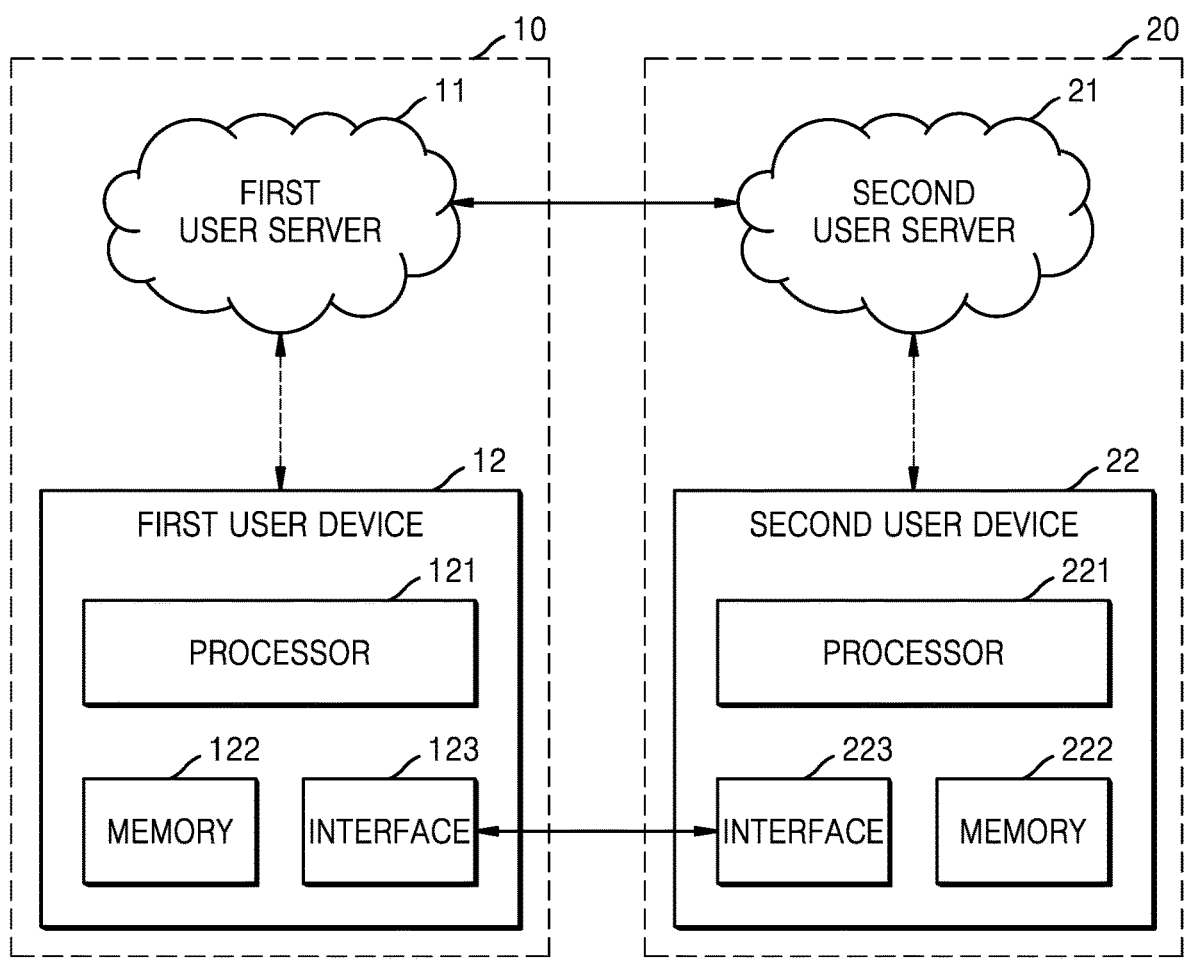
FIG. 1 is a block diagram that illustrates a configuration of a user state tracking system according to an embodiment.

Hereinafter, embodiments will be described in detail with reference to the accompanying drawings. Like reference symbols in the drawings may denote like elements, and to the extent that a description of an element has been omitted, it may be understood that the element is at least similar to corresponding elements that are described elsewhere in the specification.

FIG. 1 is a block diagram that illustrates a configuration of a user state tracking system according to an embodiment.

Referring to FIG. 1, the user state tracking system may include a plurality of user systems 10 and 20. A first user system 10 may include a first user server 11 and a first user device 12. A second user system 20 may include a second user server 21 and a second user device 22. The first user system 10 may communicate with another user system through the first user server 11 and/or the first user device 12. The second user system 20 may communicate with another user system through the second user server 21 and/or the second user device 22. The user state tracking system may designate the first or second user server 11 or 21 for each of the first and second user devices 12 and 22. For example, the user state tracking system may link the first or second user server 11 or 21 to each of the first and second user devices 12 and 22 according to a user subscriber identity module (SIM) card included in each of the first and second user devices 12 and 22.

The first user device 12 may include a processor 121, a memory 122, and an interface 123. The second user device 22 may include a processor 221, a memory 222, and an interface 223. The processors 121 and 221 may generate data to be output by respectively controlling the general operations of the first and second user devices 12 and 22. For example, each of the processors 121 and 221 may generate user information and output real-time token information based on the user information and server information received from a corresponding user server of the first and second user servers 11 and 21.

The memory 122 of the first user device 12 may store server information generated by the first user server 11 or user information generated by the processor 121. The memory 222 of the second user device 22 may store server information generated by the second user server 21 or user information generated by the processor 221. Each of the processors 121 and 221 may generate different values of user information according to scheduled times, and each of the memories 122 and 222 may map and store the scheduled times and the different values of information. Each of the processors 121 and 221 may generate real-time token information by loading server information and user information, which correspond to a generation time, from a corresponding memory of the memories 122 and 222.

The interface 123 of the first user device 12 and the interface 223 of the second user device 22 may each transmit and receive data by communicating with another user device, e.g., the first or second user device 12 or 22, and may communicate with a corresponding user server of the first and second user servers 11 and 21 respectively included in the user systems 10 and 20. When communicating with another user device, e.g., the second user device 22, the interface 123 may transmit and receive data using the same module as when communicating with the first user server 11. When communicating with another user device, e.g., the first user device 12, the interface 223 may transmit and receive data using the same module as when communicating with the second user server 21. However, embodiments are not necessarily limited thereto, and different modules may be used. For example, each of the first and second user devices 12 and 22 may communicate with another user device, e.g., the second or first user device 22 and 12, using a Bluetooth communication module and may communicate wirelessly with a corresponding server of the first and second servers 11 and 21 through a SIM card that stores user unique information.

The first or second server 11 or 21 of each of the user systems 10 and 20 may be specified as one of a plurality of hierarchical server groups. Each of the first and second servers 11 and 21 may output server information including code information regarding a hierarchical server group, and each of the first and second user devices 12 and 22 may output user information including code information specifying a user. Each of the first and second user devices 12 and 22 may generate real-time token information based on the server information regarding a server group, to which a corresponding server of the first and second servers 11 and 21 belongs, and user information that may specify a user in the server group.

Hereinafter, examples will be described in which the first user device 12 generates and transmits real-time token information to another user device and the second user device 22 receives the real-time token information and reads user information and server information.

Figure 2:
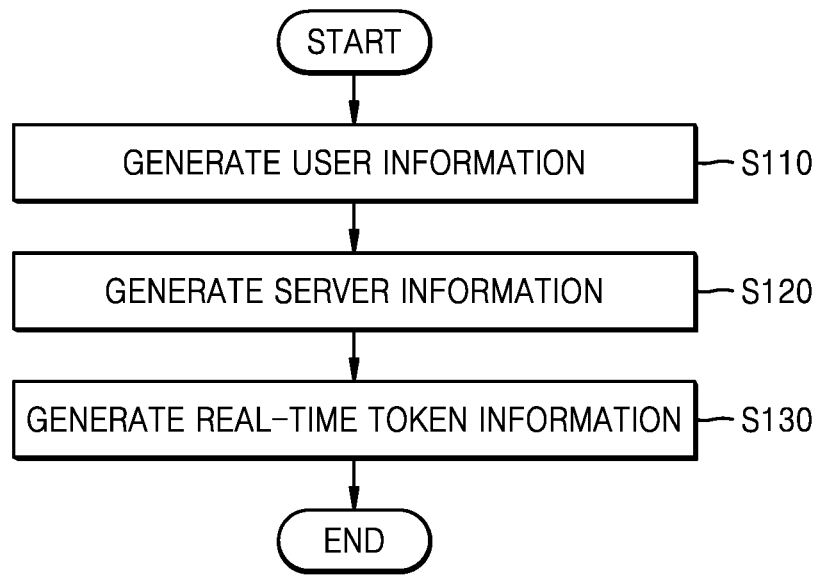
FIG. 2 is a flowchart of a method, performed by a user state tracking system, of generating real-time token information, according to an embodiment.

FIG. 2 is a flowchart of a method, performed by a user state tracking system, of generating real-time token information, according to an embodiment.

Referring to FIG. 2, the user state tracking system may generate real-time token information to be transmitted to another user device based on user information and server information. The user state tracking system may receive real-time token information, read user log information, and track user state information based on the user log information, which will be described in detail with reference to FIG. 9 below.

The user state tracking system may generate real-time token information. The real-time token information may have a part that is user information and the rest may be server information. The user information of the real-time token information may be referred to as authentication information, and the server information of the real-time token information may be referred to as certification information. The certification information may be used to verify whether a corresponding data stream is for tracking a user state, and the authentication information may be used to verify a user that has generated the real-time token information.

In operation S110, the first user device 12 may generate user information by encrypting a user's unique identification (ID) into a different value according to a scheduled time. For example, the first user device 12 may encrypt a unique ID for each time unit in first time units. For example, when a first time unit is a day, the first user device 12 may generate user information having a different value every day. The first user device 12 may generate user information by encrypting a unique ID for each time unit in second time units, wherein a second time unit is less than the first time unit, according to the user's request. An embodiment of generating user information will be described in detail with reference to FIG. 4 below.

In operation S120, the first user server 11 may generate server information including a server group code of a hierarchical server group. The hierarchical server group may include a plurality of layers, and the server group code may include a sequence of codes corresponding to the respective layers. According to an embodiment, there may be different encryption keys for the lowest server groups in the lowest layer, and the first user server 11 may generate server information based on an encryption key corresponding to a lowest server group, to which the first user server 11 belongs.

In operation S130, the first user device 12 may generate real-time token information based on the server information received from the first user server 11 and the user information generated by the first user device 12. For example, the first user device 12 may generate the real-time token information by combining data from the server information with data from the user information.

Figure 3:
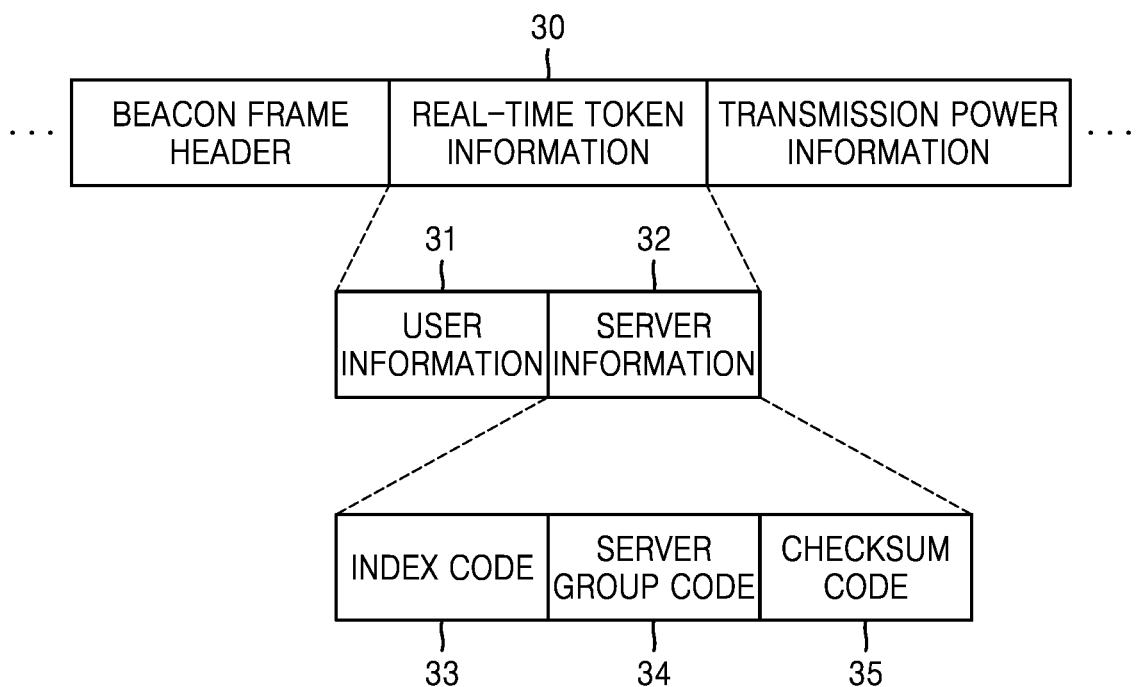
FIG. 3 is a block diagram that illustrates information constituting real-time token information, according to an embodiment.

FIG. 3 is a block diagram that illustrates information constituting real-time token information 30, according to an embodiment.

Referring to FIG. 3, the first user device 12 and the second user device 22 may read the real-time token information 30 by exchanging a series of data streams. The first user device 12 may add a beacon frame header to the front of the real-time token information 30. The beacon frame header may include indicator information used for Bluetooth communication. According to an embodiment, the beacon frame header may indicate that the subsequent information is the real-time token information 30 used for user state tracking.

The first user device 12 may add transmission power information to the back of the real-time token information 30 so that the transmission power information is transmitted to the second user device 22. When the first user device 12 and the second user device 22 operate based on Bluetooth communication, the first user device 12 may estimate the distance between the first user device 12 and the second user device 22 based on the transmission power information. According to an embodiment, the first user device 12 may estimate the proximity between users using the estimated distance.

The real-time token information 30 may include user information 31 and server information 32. The server information 32 may include a data stream of a series of codes including an index code 33, a server group code 34, and a checksum code 35. The index code 33 may include information corresponding to a time at which the real-time token information 30 is generated. For example, when the first user device 12 is scheduled to generate different values of the user information 31 for each second time unit, the index code 33 may indicate the sequence of the generated user information 31 in the second time units.

The first user server 11 may generate the server group code 34 corresponding to a hierarchical server group. An embodiment of generating the server group code 34 will be described in detail with reference to FIGS. 4 and 5 below. The checksum code 35 may be used to verify the real-time token information 30 that has been encrypted. According to an embodiment, the first user server 11 may generate the checksum code 35 by hashing the data of each of the user information 31, the index code 33, and the server group code 34 based on a hashing key. The first user server 11 may combine the checksum code 35 with the index code 33 and the server group code 34 and thus secure the integrity of the real-time token information 30. For example, the user server 11 may verify the checksum code 35, the index code 33, and the server group code 34 together to secure the integrity of the real-time token information 30. The first user server 11 may generate, as the checksum code 35, some of hash result bits generated according to a hashing algorithm.

According to an embodiment, the first user server 11 may generate the checksum code 35 by combining some of hash result bits, which are generated according to a hashing algorithm, with first time unit information. For example, when the first time unit is a day, the first user server 11 may determine the first time unit information based on a difference between an initially scheduled date and a date on which the user information 31 is scheduled.

Figure 4:
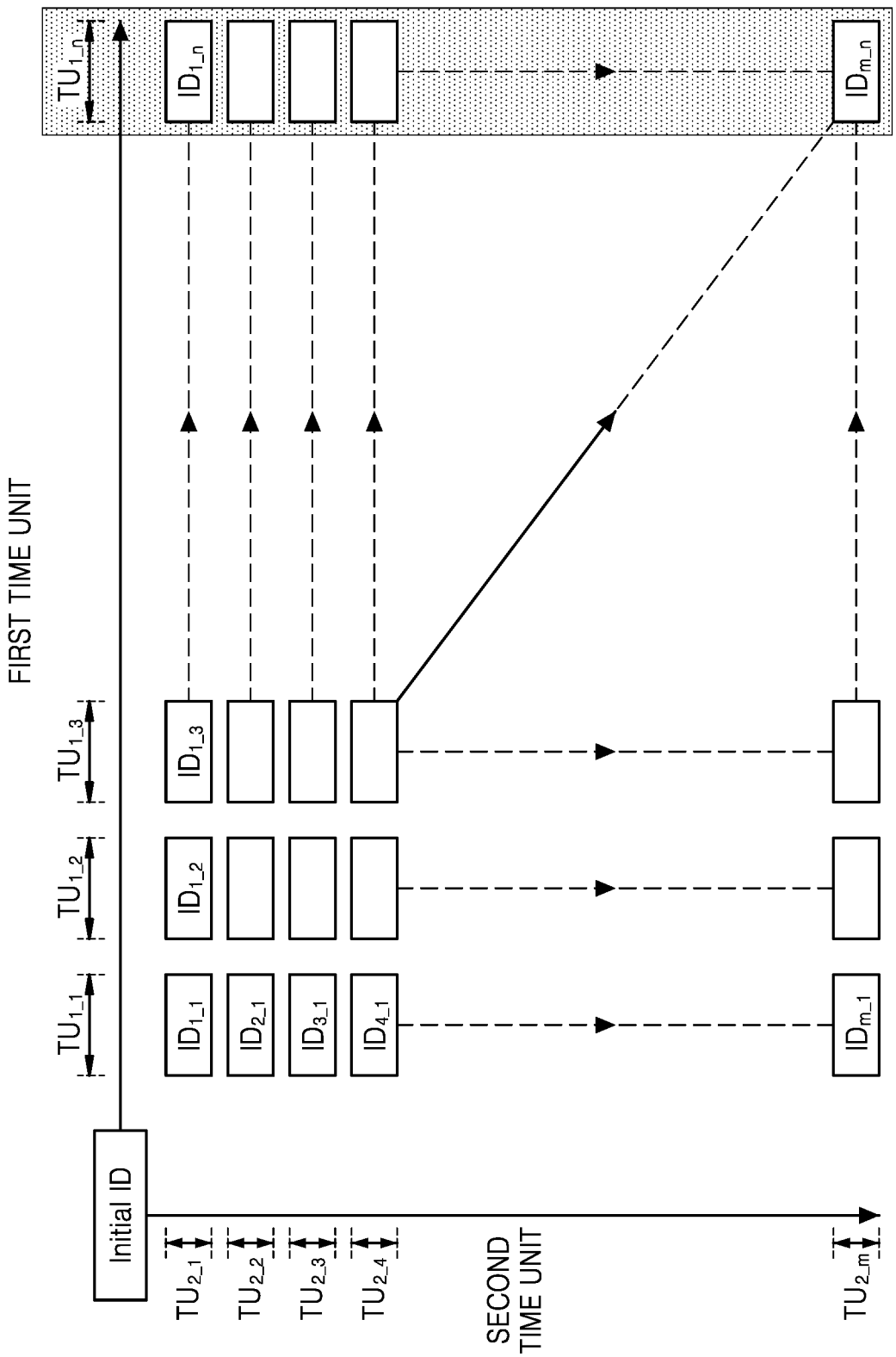
FIG. 4 is a diagram that illustrates a method of generating user information, according to an embodiment.

FIG. 4 is a diagram that illustrates a method of generating the user information 31, according to an embodiment.

Referring to FIG. 4, the first user device 12 may generate the user information 31 corresponding to a scheduled time from an initial unique ID. According to the embodiment of FIG. 4, the first time unit is greater than the second time unit. For example, in the embodiment of FIG. 4, the first time unit is longer than the second time unit. The first time unit may be referred to as a large time unit, and the second time unit may be referred to as a small time unit. For example, the first time unit may be a day, and the second time unit may be obtained by dividing 24 hours by "m", where "m" is a natural number. When "m" is 144, the first user device 12 may output the user information 31, which has been scheduled, every 10 minutes. The first user device 12 may generate the user information 31 in real time in first time units and in second time units, but embodiments are not necessarily limited thereto. When the user information 31 is generated at each of "n" ("n" is a natural number) first time units and "m" second time units, n*m pieces of the user information 31 may be generated at once and may be mapped to the time units and stored in memory.

According to an embodiment, the first user device 12 may generate the user information 31 in first time units based on an initial unique ID, a counter value, and a first encryption algorithm. For example, the first encryption algorithm may include a one-time password (OTP) generation algorithm. The first user device 12 may generate the user information 31 in second time units based on the user information 31 in first time units, an encryption key shared by the first user device 12 and the first user server 11, and a second encryption algorithm. For example, the second encryption algorithm may include an advanced encryption standard (AES) algorithm. The first encryption algorithm may be different from the second encryption algorithm, but embodiments are not necessarily limited thereto. For example, the first user device 12 may generate the user information 31 in first time units and the user information 31 in second time units based on the same encryption algorithm.

According to an embodiment, the first user device 12 and the first user server 11 may share an initial unique ID with each other and may generate the same user information 31 based on the same encryption information and encryption algorithm(s). In other words, the first user server 11 may also generate the user information 31 and may determine whether the user information 31 and the server information 32, which have been read by another user server based on the user information 31 generated by the first user server 11, are the same as those generated by the first user server 11.

Figure 5:
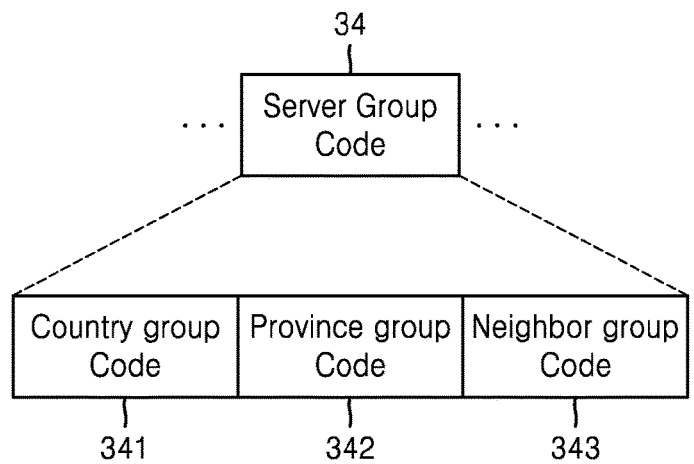
FIG. 5 is a block diagram that illustrates information constituting a server group code, according to an embodiment.
Figure 6:
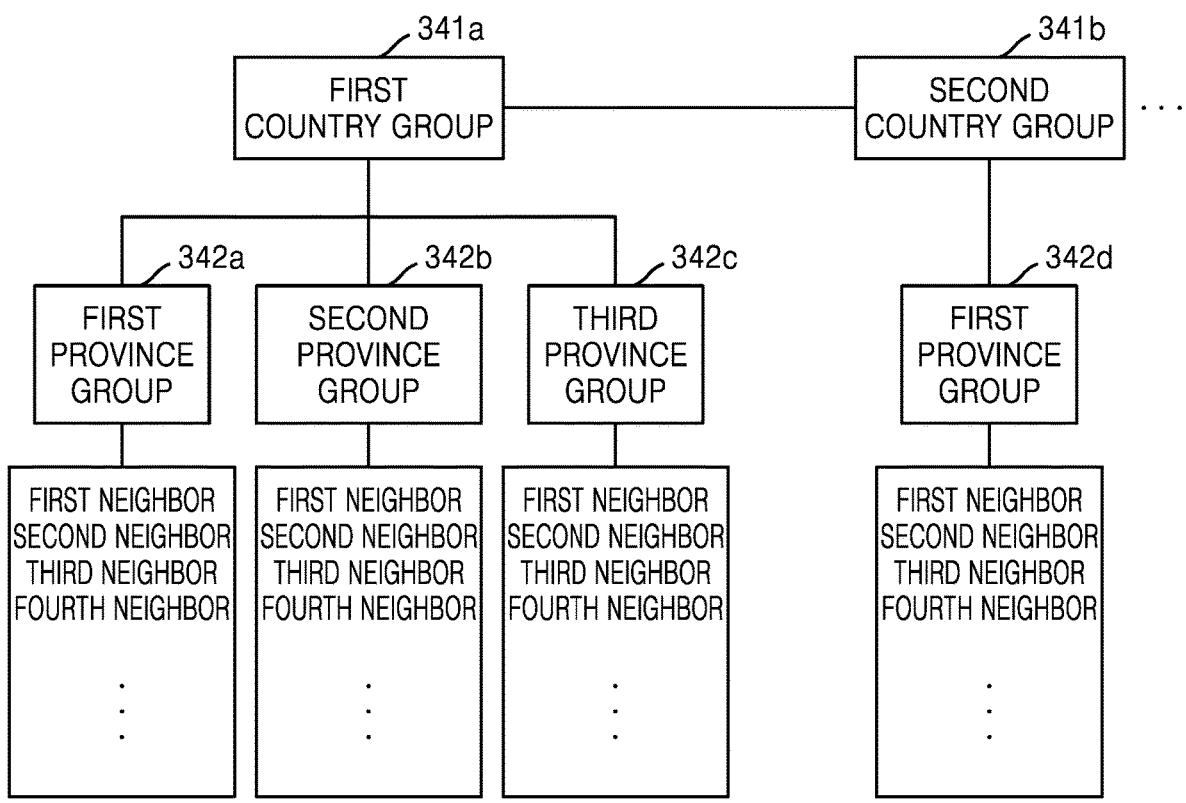
FIG. 6 is a diagram of an example of a hierarchical server group code.

FIG. 5 is a block diagram that illustrates information constituting the server group code 34, according to an embodiment. FIG. 6 is a diagram of an example of a hierarchical server group code.

Referring to FIG. 5, the server group code 34 may include a group of codes corresponding to hierarchical server groups. For example, a server group may include three server group layers, which may be stratified in order of country, province, and neighbor of server.

According to an embodiment, the server group code 34 may have a fixed value for a code for each of a country group and a province group, whereas a neighbor group code 343 may have a value that is randomly changed in accordance with, for example, third time units. A third time unit may be the same as the first time unit but is not necessarily limited thereto. The third time unit may be periodically changed for the security of the server information 32. Accordingly, the first user server 11 may obtain a unique number of each user server in correspondence to a country group and a province group and obtain the neighbor group code 343 that is managed to batch a certain number of users. The neighbor group code 343 is not shared with other user servers but is changed randomly in third time units only in the user server. The server group code 34 may be protected via encryption using, for example, a symmetric key, which is selected by the user server at a random date interval, and an encryption key for encrypting the server group code 34 may be managed by a parent server. Encrypting of the server group code 34 by a parent server will be described with reference to FIG. 7 below.

Referring to FIG. 6, servers may be stratified into a country group and a province group. The country group and the province group may be determined based on a country and a province in which a user device is located, and a user server may manage a neighbor group, to which a user belongs. After a country group code 341 and a province group code 342 are designated based on the location of a user device, the neighbor group code 343 may be designated to be randomly changed. According to an embodiment, the neighbor group code 343 may be randomly managed in third time units, and another user server may obtain encryption key information used by a nearby user server by accessing a parent server during a process of reading the server group code 34 of a user thereof from the real-time token information. The other user server may decrypt the server group code 34, which has been encrypted, and specify the user information 31 and a third time that has been encrypted into the index code 33.

For example, the first user server 11 may designate a first country group code 341a and a second province group code 342b based on a location where the first user device 12 generates the user information 31. After designating the first country group code 341a and the second province group code 342b, the first user server 11 may specify the neighbor group code 343. The neighbor group code 343 may be randomly managed. A user may be assigned the first country group code 341a, the second province group code 342b, and one of a plurality of neighbor group codes 343. A user server may encrypt the server group code 34 of a user. Accordingly, the user server may generate the server group code 34 with temporality.

Figure 7:
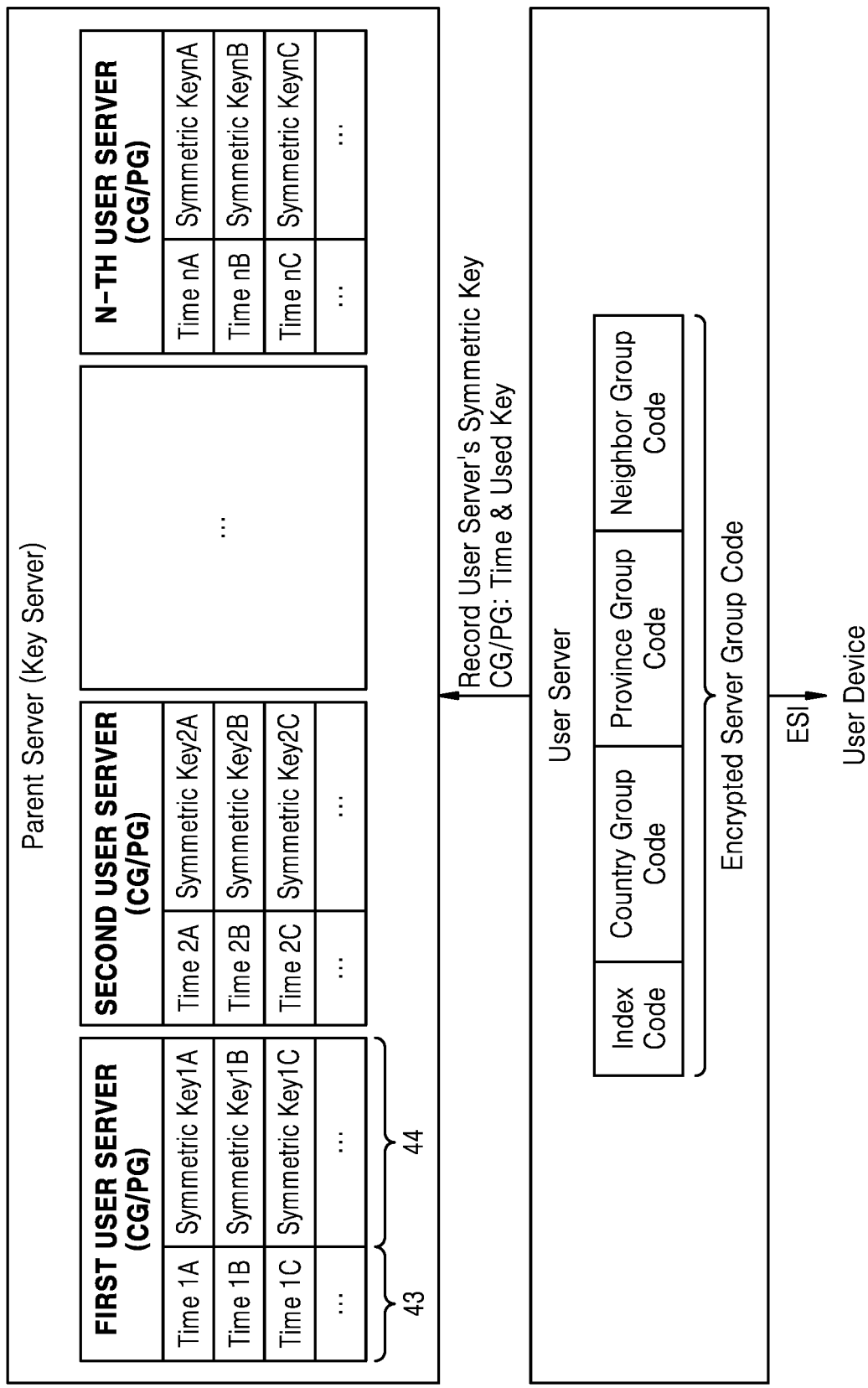
FIG. 7 is a diagram that illustrates an example in which a parent server exchanges a neighbor group code and an encryption key with a user server, according to an embodiment.

FIG. 7 is a diagram that illustrates an example in which a parent server exchanges a neighbor group code and an encryption key with a user server, according to an embodiment.

Referring to FIG. 7, before the server group code 34 of a first user is encrypted, the first user server 11 specifies the country group code 341, the province group code 342, and the neighbor group code 343 to which the first user belongs. In an embodiment, the first user server 11 generates an encrypted server group code using a symmetric key that is currently used by the first user server 11. At this time, the symmetric key may be shared, as time 43 and key information 44, with a parent server that manages encryption keys for a plurality of user servers. The parent server may store the time 43 and the key information 44. In FIG. 7, the parent server stores a symmetric key and a time value, which have been used for each country group (CG)/province group (PG) of a user server.

The parent server may provide the time 43 and the key information 44 to another user server when necessary. By contrast, a user server may decrypt the key without being provided the time 43 and key information 44. For example, a user server may receive a symmetric key, which is used by a nearby user server on a date on which a proximity log is collected, from the parent server to analyze another user token obtained by a user. The user server may determine that real-time token information is valid log information when data on which an original token is generated, data on which the original token is issued, and data on which the original token is collected are the same as the data of the real-time token information. Accordingly, an encrypted server group code may be decrypted based on the key information of each of a plurality of nearby user servers, and a neighbor group may be specified based on a decrypted server group code. The parent server may correspond to a manager server, which manages an encryption key of each user server corresponding to the country group code 341 and the province group code 342, and provide an encryption key of neighbor servers to the user server in response to a request agreed for encryption or decryption. The user server receiving the encryption key may decrypt an encrypted server group code included in real-time token information of another user, which is obtained by a user that belongs to the user server, using the encryption key. The user server may identify a user server that has encoded a key value at the time when the real-time token information is obtained, transmit the real-time token information to the user server, and request the server to specify the user information 31.

The first user server 11 that has generated an encryption key corresponding to the country group code 341 and the province group code 342 may encrypt the server group code 34, which includes the neighbor group code 343, based on the encryption key. The index code 33 may include information corresponding to a second time at which encryption is performed. For example, the index code 33 may be 1-byte data that increases from 0 by 1.

The index code 33 may act as a variable encryption initial input value to allow the neighbor group code 343 to have changing encryption based on changing time in the second time units. The index code 33 may also be used as a second time location estimation value for inspecting a user ID in a process of reading the real-time token information 30 after being exchanged between servers via upload of another user's proximity log obtained from a user. Referring back to FIG. 3, the server information 32 may include the index code 33 and the server group code 34, which includes the neighbor group code 343, the province group code 342, and the country group code 341. The checksum code 35 may be generated based on the user information 31 and the server group code 34 that has been generated and encrypted. A user server may generate the user information 31 having the same value as a user device and generate the checksum code 35, which secures data integrity, based on the user information 31 and the server group code 34. The checksum code 35 may be used to determine whether the real-time token information 30 is valid when user devices exchange the real-time token information 30 with each other. The checksum code 35 may be determined from hashing the user information 31 and the server group code 34 that has been encrypted based on a hashing key value. The hashing key value may be shared by user servers but not be open to the public. A user server may provide the server information 32 including the checksum code 35 to a user device, and the user device may generate the real-time token information 30 by combining the server information 32 with the user information 31 that has been generated by the user device.

Figure 8:
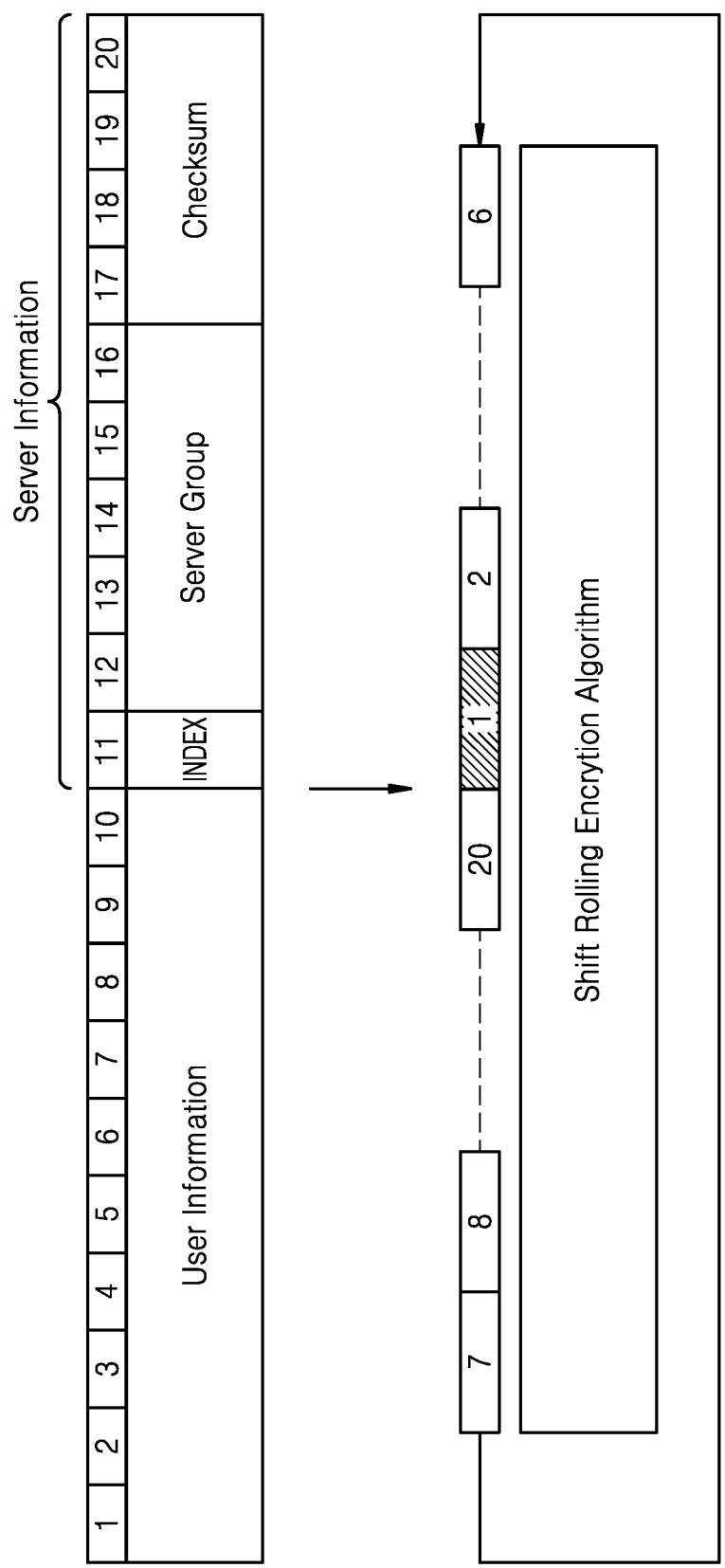
FIG. 8 is a diagram that illustrates a method of encrypting real-time token information, according to an embodiment.

FIG. 8 is a diagram that illustrates a method of encrypting the real-time token information 30, according to an embodiment.

Referring to FIG. 8, a user server may provide the server information 32, which includes the index code 33, the server group code 34 that has been encrypted, and the checksum code 35, to a user device. The first user device 12 may generate the real-time token information 30 based on the user information 31, which has been generated by the first user device 12, and the server information 32, which the first user device 12 has received from the user server. For example, when the real-time token information 30 contains twenty bytes, the left ten bytes may correspond to the user information 31 and the right ten bytes may correspond to the server information 32. In this example, data constituting the seventeenth to twentieth bytes among the right ten bytes may correspond to the checksum code 35. The checksum code 35 is determined from both the user information 31 calculated by a server and the server information 32. If the real-time token information 30 is open to the public without being encrypted, the user information 31 and the server information 32 may be revealed, and a hashing key value used to generate the checksum code 35 may also be revealed. Accordingly, the real-time token information 30 needs to be encrypted to increase its security. According to an embodiment, the first user device 12 may encrypt the real-time token information 30 to prevent the user information 31 from being unintentionally discovered if the real-time token information 30 is stolen during the exchange of the real-time token information 30 between the first user device 12 and another user device.

According to an embodiment, the first user device 12 may encrypt the real-time token information 30 based on a shift rolling encryption algorithm. The shift rolling encryption algorithm may shift the data of the real-time token information 30 at least once to the left or right. The shift rolling encryption algorithm may then shift data, which is at the end in a shift direction, to the first data in the shift direction. In other words, the shift rolling encryption algorithm may randomly rotate data.

The second user device 22 or the second user server 21 may receive the real-time token information 30 that has undergone shift rolling and decrypt the real-time token information 30 to read the user information 31 and the server information 32. For example, the second user device 22 or the second user server 21 may shift the real-time token information 30 by one or more byte(s), determine whether a hash value of the data of the real-time token information 30 except for data corresponding to the region of the checksum code 35 is the same as the checksum code 35, and decrypt the real-time token information 30.

For example, the second user device 22 or the second user server 21 may shift the real-time token information 30 which contains twenty bytes to the left or right by one byte and may decrypt the real-time token information 30 according to whether a hash value of data in a region from the first byte to the sixteenth byte is the same as data in a region from the seventeenth byte to the twentieth byte. The second user device 22 or the second user server 21 may shift the real-time token information 30 by one byte once more if the hash value is not the same as the data in the region from the seventeenth byte to the twentieth byte.

Figure 9:
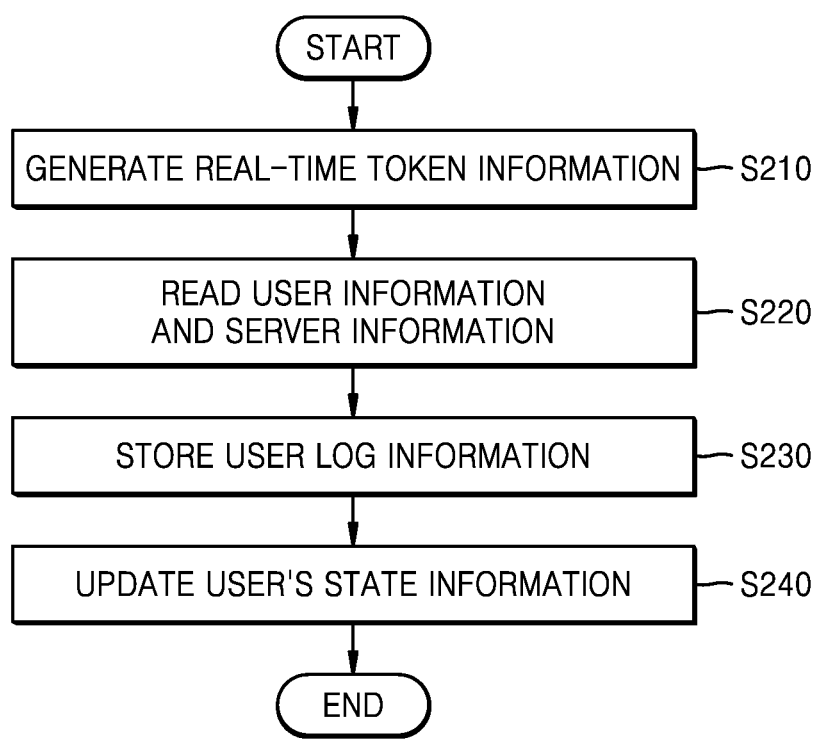
FIG. 9 is a flowchart of a method of tracking a user state, according to an embodiment.

FIG. 9 is a flowchart of a method of tracking a user state, according to an embodiment.

Referring to FIG. 9, the second user device 22 may receive the real-time token information 30 from another user device, specify a user of the other user device, and track the user's current state information. The user's state information may indicate the user's health condition, for example, whether the user has been infected with a certain virus or disease, and may allow the proximity to infection to be tracked.

The second user server 21 may receive the real-time token information 30 from the first user server 11 in operation S210. The real-time token information 30 received from the first user server 11 may include codes corresponding to a time at which a token exchange is requested. According to an embodiment, the second user server 21 may obtain the real-time token information 30 regarding a first user from the second user device 22, which has received the real-time token information 30 from the first user device 12 corresponding to the first user server 11. However, embodiments are not necessarily limited thereto. For example, the second user server 21 may directly obtain the real-time token information 30 regarding the first user from the first user server 11. An embodiment in which the second user server 21 receives the real-time token information 30 directly from the first user server 11 will be described with reference to FIG. 11 below.

In operation S220, the second user server 21 may read the user information 31 of the first user and the server information 32 based on the real-time token information 30 regarding the first user. When the real-time token information 30 has been encrypted according to the embodiment of FIG. 8, the second user server 21 may decrypt the real-time token information 30 and read the user information 31 and the server information 32. After decrypting the real-time token information 30, the second user server 21 may identify a server group, to which the first user server 11 belongs, based on an encryption key received from a parent server. Thereafter, the second user server 21 may compare a verifier field with all users belonging to the server group and specify a second user that has transmitted the real-time token information 30.

In operation S230, the second user server 21 may store user log information based on the user information 31 and the server information 32. For example, the user log information may include information about a time at which the real-time token information 30 is exchanged and the user information 31 of the specified user. When the state information of the second user is changed, the user log information may be used to inform users which have exchanged the real-time token information 30 with the second user that the state information of the second user has changed. For example, when the second user has been infected with a certain virus, the second user server 21 may notify the infected state of the second user to users that have exchanged the real-time token information 30 with the second user by being in proximity to the second user.

In operation S240, the second user server 21 may store user log information regarding the first user and periodically update the state information of other users including the first user. However, embodiments are not necessarily limited thereto. The second user server 21 may update the state information of other users not only periodically but also at the request of the second user and may provide the state information of the second user to other users.

Figure 10:
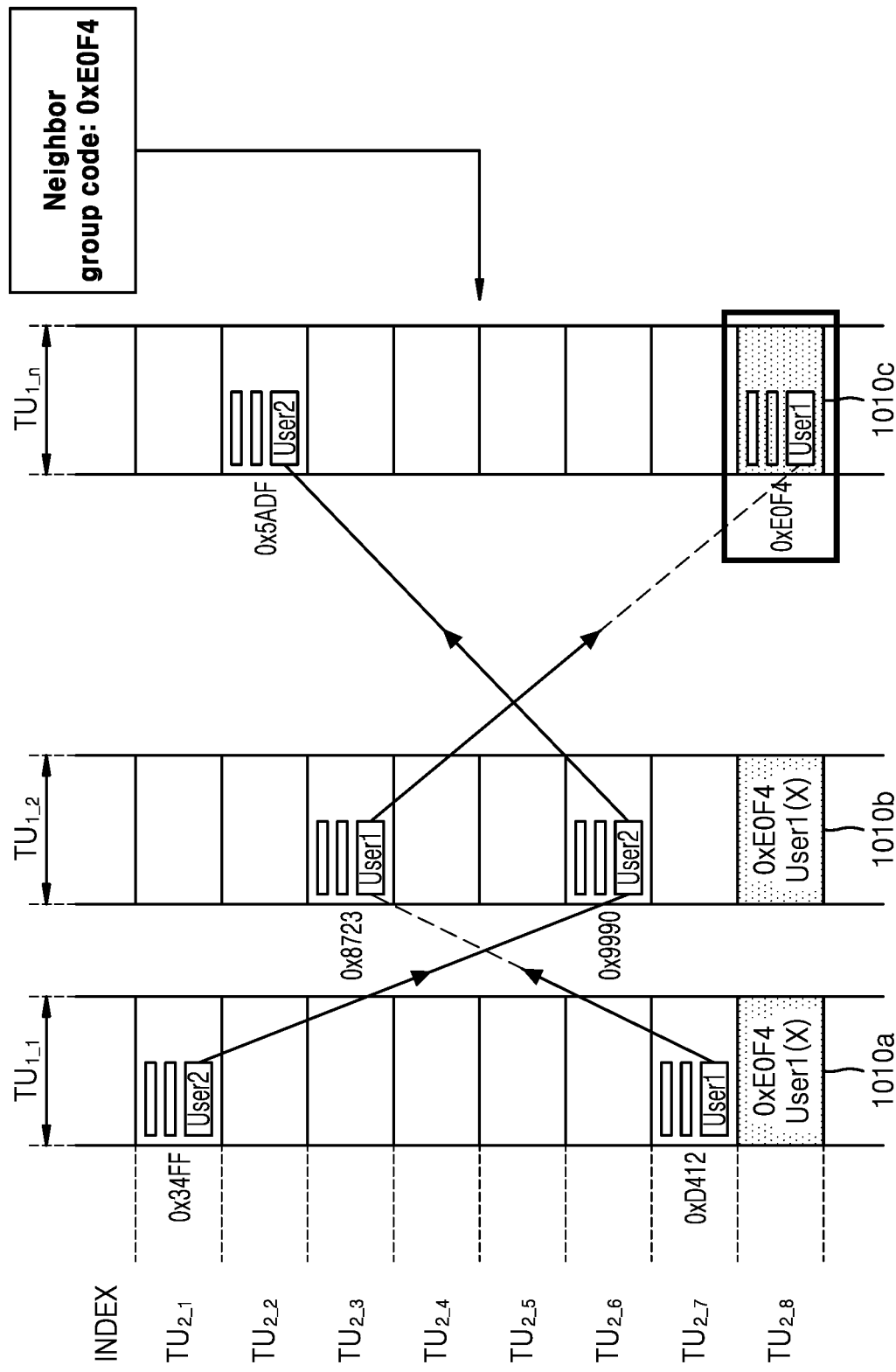
FIG. 10 is a diagram that illustrates an example of specifying a user based on real-time token information, according to an embodiment.

FIG. 10 is a diagram that illustrates an example of specifying a user based on the real-time token information 30, according to an embodiment.

Referring to FIG. 2, the second user server 21 may receive the real-time token information 30 regarding a first user and read the server group code 34 included in the real-time token information 30. The second user server 21 may specify the first user's server through the country group code 341 and the province group code 342 included in the server group code 34 and, with the help of the first user's server, may specify a group including a user of the first user server 11 based on the neighbor group code 343 of the first user, which is also read from the server group code 34. The neighbor group code 343 may be obtained from a value within the real-time token information 30 that changes with the third time units in which the real-time token information 30 is generated. The group including the user may be obtained based on the neighbor group code 343 and data on which a proximity log is obtained. The index code 33 may correspond to a second time unit at which the user information 31 is generated. Accordingly, based on the index code 33, the second user server 21 may obtain the number of times the user information 31 of the first user has been encrypted in small time units and a second time that is defined in second time units. A first time may be estimated based on a date on which the proximity log is obtained, and a user may be specified by changing the user information 31 of users belonging to the group by the first time and the second time (where the changed result is referred to as a verifier) and comparing the verifier with the user information 31 read from the real-time token information 30 that has been encrypted. For example, the second time unit may be 10 minutes, and the second user server 21 may obtain a time in 10-minute units, in which the user information 31 is generated, based on the index code 33.

The neighbor group code 343 may have a random value in third time units within the first user server 11, and with the help of the first user server 11, the second user server 21 may specify a neighbor group, to which a plurality of users belong, based on the neighbor group code 343 read from the real-time token information 30. For example, the neighbor group code 343 may be randomly but not duplicately assigned to each neighbor group in third time units, e.g., every day. When the second user server 21 reads "OxE0F4" as the neighbor group code 343 from a proximity log, the second user server 21 may select the neighbor group that has had "OxE0F4" as the neighbor group code 343 on a date on which the proximity log was obtained.

The second user server 21 may specify a valid user by verifying if users included in a neighbor group are valid based on the user information 31 read from the real-time token information 30. When the first user server 11 generates the user information 31, the first user server 11 may encrypt the user information 31 to have values that change with time based on first time units and based on second time units. As described above, the second user server 21 may specify a time in second time units, at which the real-time token information 30 is generated, based on the index code 33 and may estimate a time in first time units based on data on which a proximity log was obtained. A valid user in the first user server 11 may be specified by comparing the user information 31, which is generated by the first user server 11 at the time in first time units and the time in second time units, with the user information 31 read from the real-time token information 30 of the proximity log.

For example, referring to FIG. 10, when information about a time at which the proximity log is obtained is the same as a date $TU_{1\_n}$, the second user server 21 may select a neighbor group in an eighth place $TU_{2\_8}$ on the date $TU_{1\_n}$ based on "OxE0F4" read as the neighbor group code 343. The second user server 21 may select a neighbor group 1010c, which corresponds to the neighbor group code 343 of "OxE0F4", among neighbor groups 1010a through 1010c respectively corresponding to first through n-th time sections $TU_{1\_1}$ through $TU_{1\_n}$ defined in third time units, where "n" is a natural number. The second user server 21 may match a first time unit in which the real-time token information 30 is generated to the date on which the proximity log is obtained and may determine a time in second time units based on the index code 33. The second user server 21 may compare a plurality of pieces of the user information 31 in the neighbor group with the user information 31 read from the real-time token information 30, thereby specifying a user that has generated the real-time token information 30. Accordingly, the second user server 21 may specify the first user that has generated the real-time token information 30 based on the real-time token information 30 that has been encrypted and store log information regarding the first user. For example, "specifying" a user may mean determining a user's past or present state information or proximity information.

Figure 11:
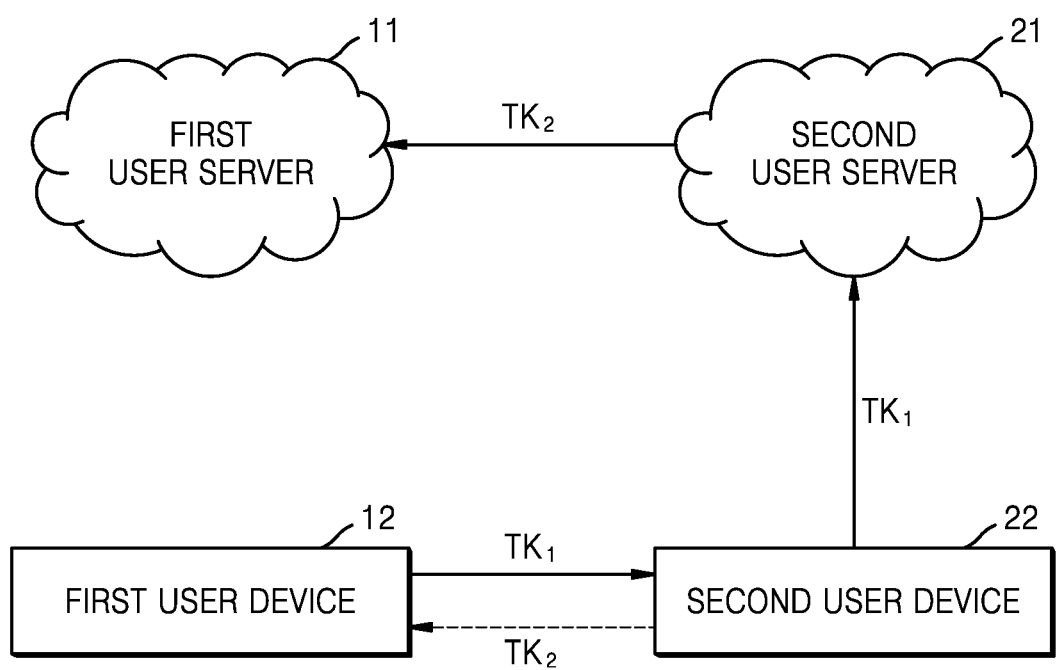
FIG. 11 is a diagram that illustrates an example of the exchange of real-time token information among a plurality of users, according to an embodiment.

FIG. 11 is a diagram that illustrates an example of the exchange of the real-time token information 30 among a plurality of users, according to an embodiment.

According to an embodiment, when the first user device 12 and the second user device 22 exchange the real-time token information 30, the real-time token information 30 received by each of the first user server 11 and the second user server 21 may be updated. However, the first user device 12 might not receive the real-time token information 30 from the second user device 22, as shown in FIG. 11. For example, the second user device 22 may receive the real-time token information 30 from the first user device 12 and update the real-time token information 30 in the second user server 21, whereas the first user device 12 might not update the real-time token information 30 regarding the second user device 22 in the first user server 11.

Referring to FIG. 11, when the first user device 12 does not receive second real-time token information $TK_2$ from the second user device 22, the first user server 11 may receive the second real-time token information $TK_2$ from the second user server 21. The second user server 21 may receive first real-time token information $TK_1$ from the second user device 22 and read the user information 31 included in the first real-time token information $TK_1$. According to an embodiment, the first real-time token information $TK_1$ may include first user information that has been encrypted. Reading the first user information from the real-time token information 30 that has been encrypted has already been described with reference to FIG. 1 above, and thus, redundant descriptions thereof are omitted. When the second user server 21 specifies the first user server 11 based on the first user information, the second user server 21 may transmit the second real-time token information $TK_2$ to the first user server 11. Accordingly, the first user server 11 may store the second real-time token information $TK_2$ and periodically monitor the state information of a second user, for example, with respect to infection, thereafter.

Figure 12:
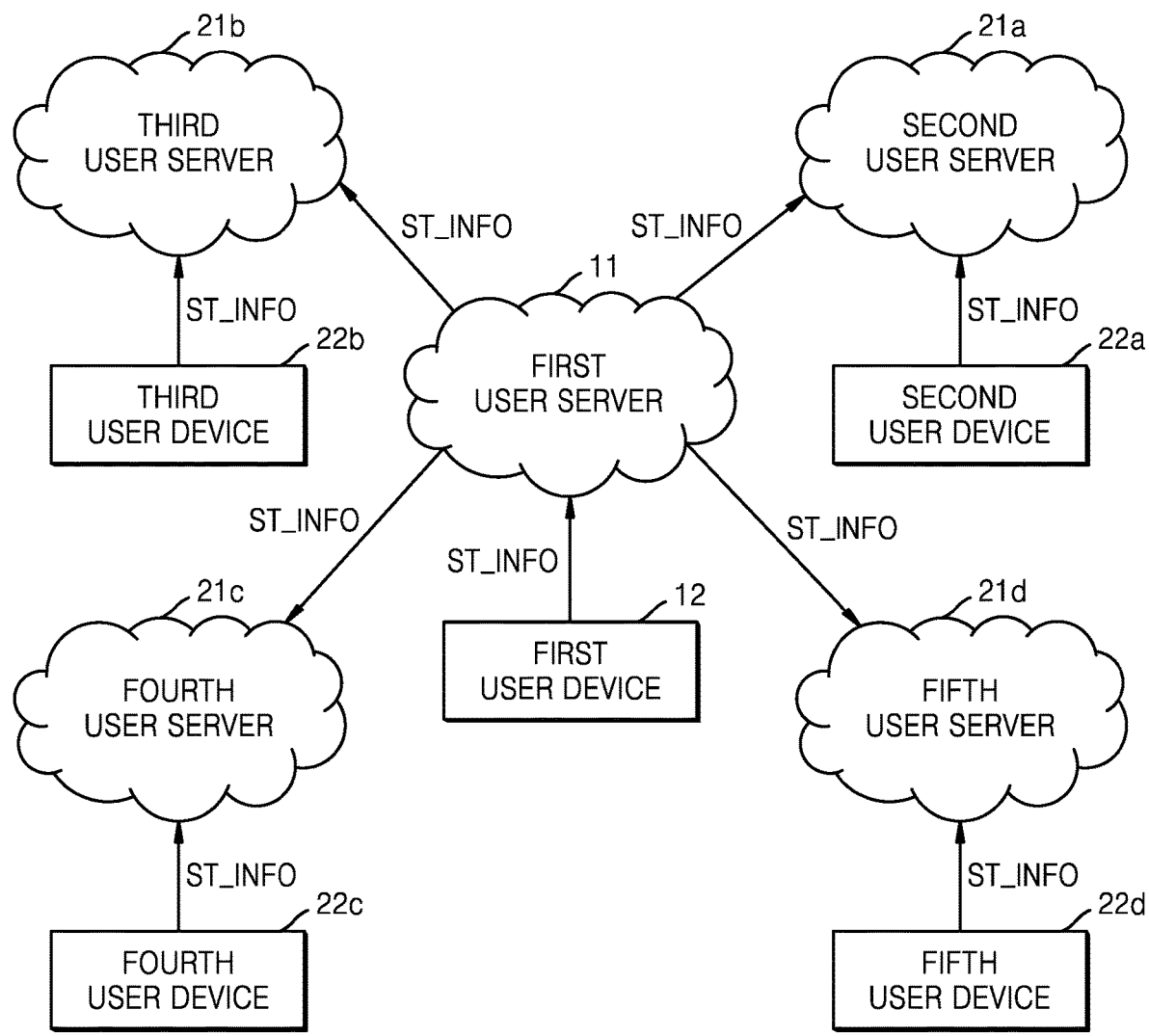
FIG. 12 is a diagram that illustrates an example of transmitting state information of a first user to a plurality of other users, according to an embodiment.

FIG. 12 is a diagram that illustrates an example of transmitting state information of a first user to a plurality of other users, according to an embodiment.

Referring to FIG. 12, the first user server 11 may share the state information ST_INFO of the first user with a plurality of other user servers. The first user server 11 may transmit the state information ST_INFO of the first user to other user servers periodically or at other users' requests. The state information ST_INFO of a user may indicate the real-time infection status or emergency status of the user.

The first user device 12 may change a user state in response to a user's request or a command of a central management server. For example, when the user or the central management server changes the user's infection status to indicate that the user has been infected with a certain disease, the first user device 12 may inform the first user server 11 that the user state is changed from a normal state into an infected state. When the first user server 11 is informed of a state change, the first user server 11 may inform other users' servers of the state change based on user log information stored therein. The other users informed of the state change by the first user server 11 may have exchanged the real-time token information 30 with the first user within a certain period and may be highly likely to be infected because they have been in proximity to the first user.

Other user servers, e.g., second through fifth user servers 21*a* through 21*d*, which have received the state change, may inform users thereof that the state of the first user has been changed through user devices, e.g., second through fifth user devices 22*a* through 22*d*, respectively. Accordingly, second through fifth users having exchanged the real-time token information 30 with the first user in proximity to the first user may determine that they are likely to have been infected.

Figure 13:
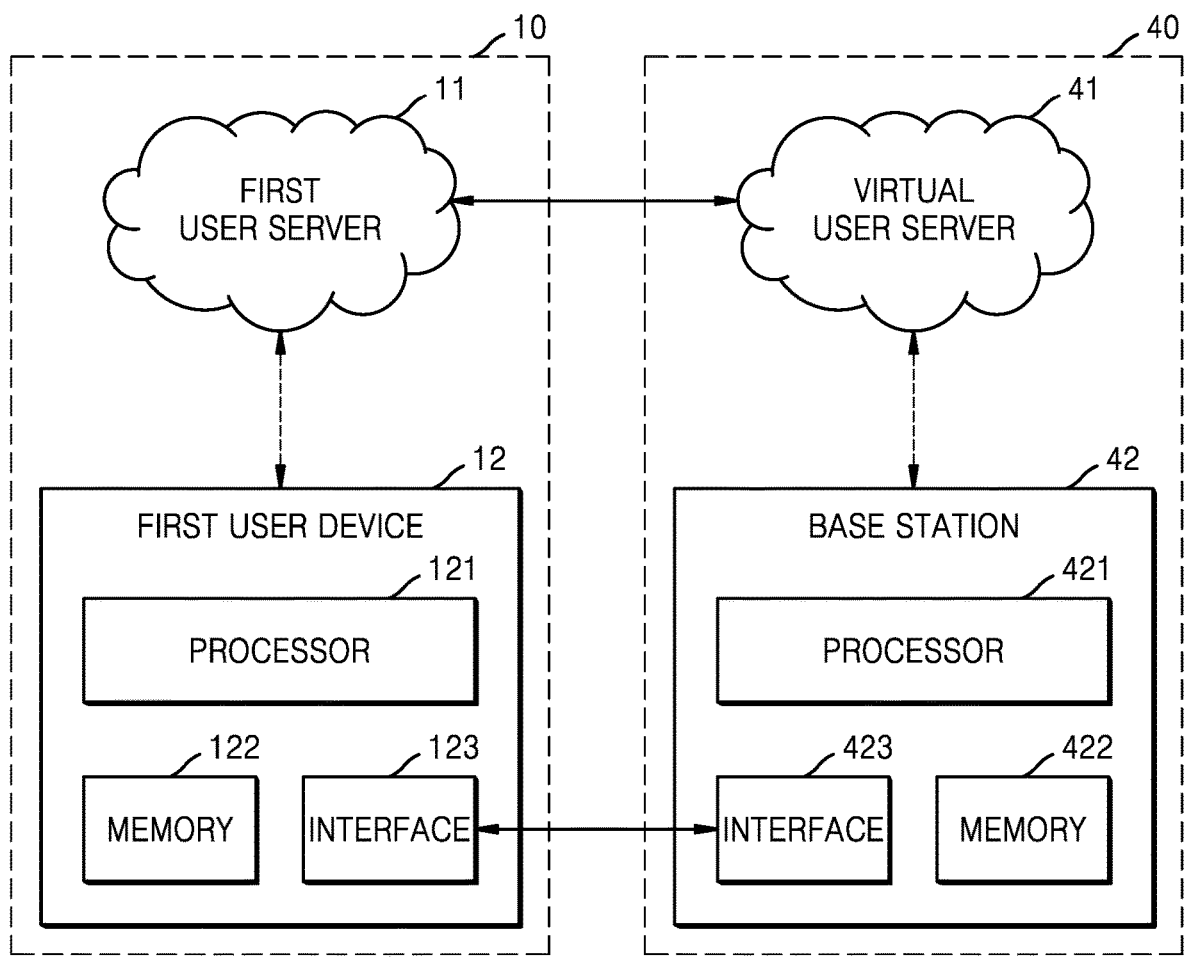
FIG. 13 is a block diagram that illustrates the configuration of a user state tracking system, which exchanges data with a base station, according to an embodiment.

FIG. 13 is a block diagram that illustrates the configuration of a user state tracking system, which exchanges data with a base station 42, according to an embodiment.

Referring to FIG. 13, the first user device 12 may exchange the real-time token information 30 by wirelessly communicating with the base station 42. According to an embodiment, the base station 42 may be a femto cell base station. In this example, although the base station 42 may allow only subscribers in a closed subscriber group (CSG) to camp on, the base station 42 may transmit the real-time token information 30 to a plurality of user devices in a certain range including the first user device 12, without user subscription, during public land mobile network (PLMN) searching. The base station 42 may receive the real-time token information 30 from at least one user terminal and store user log information in memory thereof.

According to an embodiment, the base station 42 might not receive the real-time token information 30 of a user but only transmit the real-time token information 30 of the base station 42 to a user device. The base station 42 may include the real-time token information 30 in a cell broadcast message and transmit the cell broadcast message to at least one user device. For example, the cell broadcast message may be used to broadcast warning messages to the public. The base station 42 may also access a server as a virtual user and use the real-time token information 30, which has undergone authentication and certification in certain time units, thereby transmitting the real-time token information 30 to a plurality of user devices.

A user device may perform cell searching to obtain information about a nearby base station, e.g., the base station 42, and obtain PLMN information from the base station 42. Thereafter, when the PLMN information is included in a PLMN list defined in the universal SIM (USIM) of the user device, the user device may perform a network camp on operation in which various kinds of non-access stratum (NAS) signaling are performed. At this time, each user device may receive the cell broadcast message and read the real-time token information 30 of the base station 42. For example, when the user device is in a roaming mode, the user device may search nearby cells at intervals of multiples of 6 minutes and may receive PLMN information and the real-time token information 30.

Figure 14:
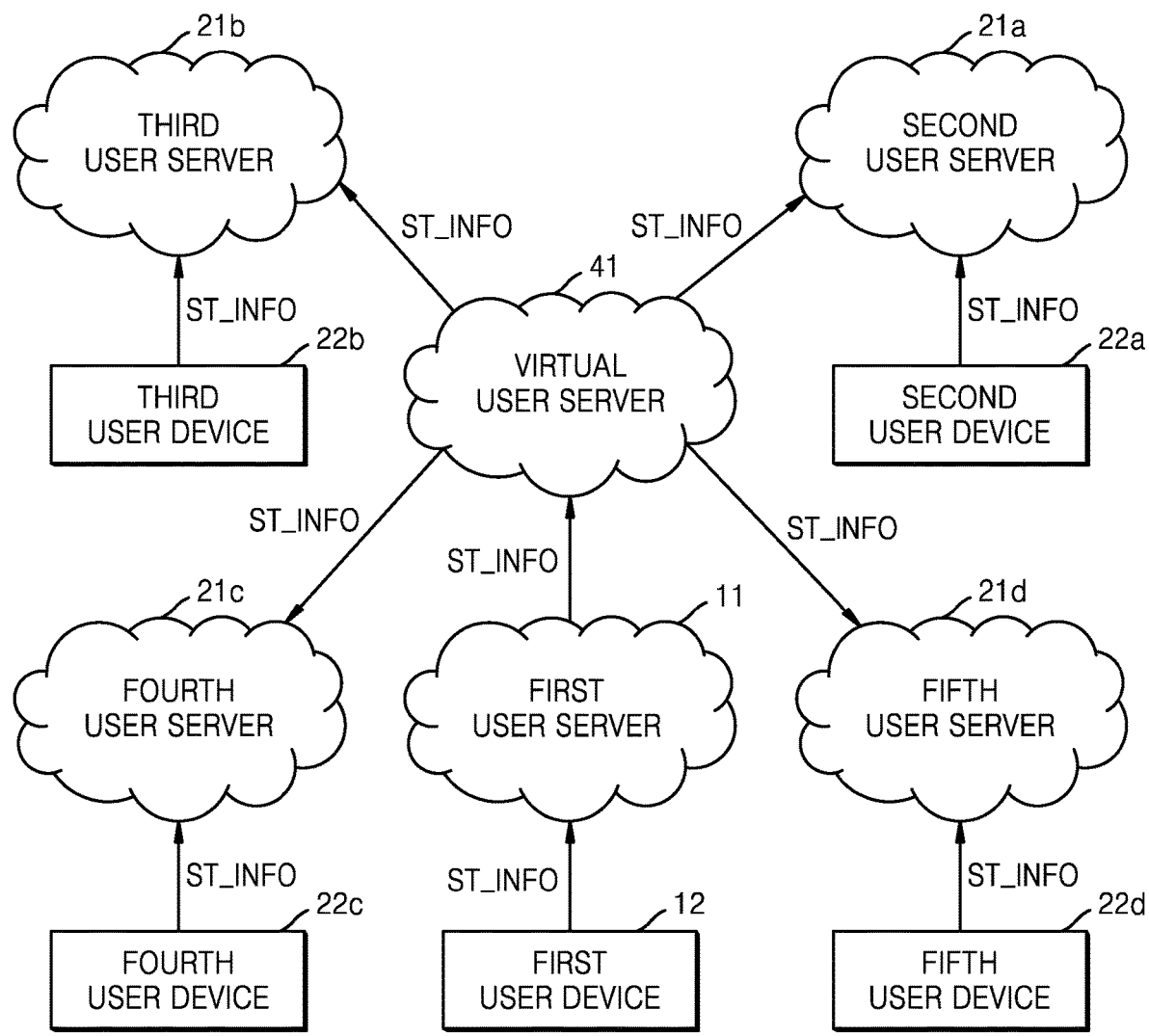
FIG. 14 is a diagram that illustrates an example of transmitting the state information of a first user to a plurality of other users through a base station.

FIG. 14 is a diagram that illustrates an example of transmitting the state information of a first user to a plurality of other users through the base station 42.

Referring to FIG. 14, the first user device 12 may receive the real-time token information 30 from the base station 42. When there is a change in user state information ST_INFO, the first user device 12 may inform a virtual user server 41 that the state information has been changed. Specifying the virtual user server 41 based on the real-time token information 30 received from the base station 42 has already been described above with reference to FIG. 10, and thus, detailed descriptions thereof are omitted. When the first user device 12 specifies a reception time of the real-time token information 30, the base station 42 may inform all user devices, e.g., the second through fifth user devices 22*a* through 22*d*, which received the real-time token information 30 from the base station 42 at the reception time, that the state of the first user has been changed. In other words, even when users have not directly exchanged the real-time token information 30 with the first user, the users are highly likely to have been infected if the users are within a short range in which the users are able to communicate with the base station 42, accordingly, the virtual user server 41 may inform a plurality of user servers that there may be a high risk of infection.

In a system in accordance with the aspects of a present disclosure, users may be securely informed of other users' state change information. A user device may communicate with another user device or base station, and accordingly, even if two servers respectively assigned to the two users do not directly communicate, the real-time token information may be validated and the users' state information may be securely shared.

While the inventive concept has been particularly shown and described with reference to embodiments thereof, it will be understood that various changes in form and details may be made therein without departing from the spirit and scope of the following claims.

What is claimed is:

1. A user log information output system comprising:
    a first user device configured to generate first user information by encrypting a unique identification (ID) of a first user according to a scheduled time, wherein the first user device includes a processor, a memory and an interface;
    a first user server configured to generate first server information, the first server information including a server group code of a hierarchical server group;
    a second user device configured to receive real-time token information from the first user device, the real-time token information being generated based on the first user information and the first server information, wherein the second user device includes a processor, a memory and an interface; and
    a second user server configured to generate proximity log information regarding the first user by reading the first user information and the first server information of the real-time token information in the real-time token information received from the second user device,
    wherein the first user device or the first user server generates the first server information, and wherein the first server information is based on a first unique ID that includes time information in first time units, a counter value, and a first encryption algorithm, and
    wherein the first user device and the first user server are further configured to generate a second unique ID including time information based on second time units that are within a first time unit, and wherein the generation of the second ID is based on the first unique ID generated in the first time units, an encryption key, and a second encryption algorithm and wherein the encryption key is shared by the first user device and the first user server.

2. The user log information output system of claim 1, wherein the first user server is further configured to generate the real-time token information by encrypting the first user information and the first server information.

3. The user log information output system of claim 1, wherein the first server information further includes an index code corresponding to the scheduled time.

4. The user log information output system of claim 3, wherein the first server information further includes a checksum code obtained by hashing the server group code, the index code, and the first user information based on a hashing key, and
the second user server is further configured to decrypt the real-time token information based on the checksum code.

5. The user log information output system of claim 1, wherein the first user device is further configured to transmit the real-time token information to the second user device through Bluetooth communication.

6. A user log information output system comprising:
a first user device configured to generate first user information by encrypting a unique identification (ID) of a first user according to a scheduled time, wherein the first user device includes a processor, a memory and an interface;
a first user server configured to generate first server information, the first server information including a server group code of a hierarchical server group;
a second user device configured to receive real-time token information from the first user device, the real-time token information being generated based on the first user information and the first server information, wherein the second user device includes a processor, a memory and an interface; and
a second user server configured to generate proximity log information regarding the first user by reading the first user information and the first server information of the real-time token information in the real-time token information received from the second user device,
wherein the first server information further includes an index code corresponding to the scheduled time, and
wherein the first user server is further configured to generate the first server information by encrypting the server group code and the index code in third time units based on an encryption key designated for each server group.

7. The user log information output system of claim 6, further comprising a parent server configured to store a plurality of encryption keys designated for respective server groups,
wherein the second user server is further configured to decrypt the server group code and the index code based on the plurality of encryption keys stored in the parent server, the server group code and the index code having been encrypted in the third time units.

8. The user log information output system of claim 7, wherein the second user server is further configured to generate information about a generation time and server location of the real-time token information as log information regarding the first user, and wherein the generated log information is based on the server group code and the first user information.

9. An operating method of a user log information output system, the operating method comprising:
generating user information by encrypting a unique identification (ID) of a user according to a scheduled time;
generating server information including a server group code of a hierarchical server group; and
generating real-time token information regarding the user based on the user information and the server information,
wherein the generating of the server information includes generating an index code corresponding to the scheduled time, and
wherein the generating of the server information further includes generating a checksum code by hashing the server group code, the index code, and the user information using a hashing key.

10. The operating method of claim 9, further comprising generating log information regarding another user in response to reception of real-time token information, by reading other user information and other server information, wherein the real-time token information is generated from the other user.

11. The operating method of claim 10, further comprising transmitting the real-time token information regarding the user to a user server corresponding to the other server information.

12. The operating method of claim 9, wherein the generating of the user information includes generating a unique ID in first time units based on the unique ID, a counter value, and a first encryption algorithm.

13. The operating method of claim 12, wherein the generating of the unique ID in first time units includes generating a unique ID in second time units, wherein the second time units comprise units within a first time unit, and wherein the generation of the unique ID in the second time units is based on the unique ID generated in the first time units, an encryption key, and a second encryption algorithm.

* * * * *